United States Patent [19]

Jacob et al.

[11] Patent Number: 4,982,353
[45] Date of Patent: Jan. 1, 1991

[54] SUBSAMPLING TIME-DOMAIN DIGITAL FILTER USING SPARSELY CLOCKED OUTPUT LATCH

[75] Inventors: Philippe L. Jacob; Sharbel E. Noujaim, both of Clifton Park; Glenn A. Forman, Schenectady; John A. Mallick, Scotia, all of N.Y.

[73] Assignee: General Electric Company, Schenectady, N.Y.

[21] Appl. No.: 414,869

[22] Filed: Sep. 28, 1989

[51] Int. Cl.$^5$ .................. G06F 15/31; H03K 19/00; H03K 17/00
[52] U.S. Cl. .................. 364/724.10; 307/452; 307/594; 307/443
[58] Field of Search .................. 364/724.10; 307/453, 307/481, 452, 605, 594, 596, 585, 443; 341/100, 101

[56] References Cited

U.S. PATENT DOCUMENTS

| | | | |
|---|---|---|---|
| 4,395,774 | 7/1983 | Rapp | 307/452 |
| 4,495,426 | 1/1985 | Leach | 307/453 |
| 4,768,018 | 8/1988 | Noujaim | 340/347 AD |
| 4,799,040 | 1/1989 | Yanagi | 341/101 |
| 4,820,943 | 4/1989 | Makino et al. | 307/452 |

*Primary Examiner*—Dale M. Shaw
*Assistant Examiner*—Long T. Nguyen
*Attorney, Agent, or Firm*—Allen L. Limberg; James C. Davis, Jr.; Marvin Snyder

[57] ABSTRACT

The plural-phase clocking signal used in a subsampling time-domain digital filter is partially blanked to generate a sparse clocking signal for a clocked data latch that decimates the output signal from the digital filter, to supply it at a subsampling rate as compared to the sampling rate of input signal to the filter. The blanking signal is generated from a counter that counts occurrences of pulses in the plural-phase clocking signal, which counter comprises a ripple-carry adder and another clocked data latch arranged to accumulate successive unit values. This procedure guarantees correct timing of clocking signal for the output latch vis-a-vis the plural-phase clocking signal used in the preceding time-domain digital filter despite the time taken for carry ripplethrough in the counter adder. Digital hardware is conserved by blanking only one phase of the plural-phase clocking signals.

21 Claims, 8 Drawing Sheets

NON-OVERLAPPING CLOCK PULSES
$\phi_1$ & $\phi_2$ HAVE PULSE RATES ONE OF WHICH IS SUBMULTIPLE TO THE OTHER

CLOCKED INVERTER CI1

CLOCKED INVERTER CI2

NON-OVERLAPPING CLOCK PULSES $\phi_1$ & $\phi_2$ HAVE PULSE RATES ONE OF WHICH IS SUBMULTIPLE TO THE OTHER

SUBSAMPLING TIME-DOMAIN DIGITAL FILTER USING SPARSELY CLOCKED OUTPUT LATCH

The invention relates to a subsampling time-domain digital filters using accumulators and more particularly to the provision of clocking signals for those filters.

BACKGROUND OF THE INVENTION

A subsampling time-domain digital filter responds to a digital signal supplied at a relatively high sample rate to generate a digital output signal at a relatively low sample rate. Input digital signal samples are grouped into sets of samples contiguous in time, each set of samples then being weighted and summed together to generate a respective output signal sample. If all weights are positive-valued, the subsampling filter will exhibit a low-pass filter response. A subsampling filter exhibiting a low-pass filter response is sometimes referred to as a "decimation" filter, especially when such a filter is used together with an oversampling analog-to-digital converter.

In a subsampling time-domain digital filter, rather than differentially delaying the input signal samples in each set and parallelly adding them after weighting, thereby to generate output signal samples, an accumulator can be used to add sequentially the successive input signal samples after their weighting. The accumulator is periodically reset after each set of weighted samples has been supplied thereto, which periodic resetting is implemented using a sample counter. Just prior to the resetting of the accumulator, its contents as supplied to a subsequent data latch are latched into that subsequent latch in a subsampling or decimation procedure. Where the filter response is to be used in parallel-bit format, these contents held in the subsequent data latch until the next set of weighted samples have been accumulated. Where the filter response is to be used in serial-bit form, the subsequent data latch can take the form of a parallel-in/serial-out (PISO) shift register with the contents of the accumulator loaded into it in parallel, thereafter to be clocked out serially a bit at a time at some multiple of the loading rate.

In either case the loading procedure requires that the phase of the relatively low sample rate clock used to time loading of the data latch for output signal samples be correctly timed respective to the high sample rate clock supplied to the accumulator to condition it to receive input samples. Loading of the data latch must be completed before the high sample rate clock supplied to the accumulator clocks its reset.

The inventors find that a clocked data latch used for subsampling the decimation filter output signal can be clocked with clocking signals generated by blanking selected pulses in the clocking signals used in preceding portions of the filter. This procedure assures proper temporal alignment of the loading of the clocked data latch.

This arrangement replaces the conventional arrangement where square waves provided from the most significant bit place of the same counter clocked at the high sample rate are used as a basis for generating a set of plural-phase clocking signals at the low sample rate which phases have non-overlapping pulses. In this conventional arrangement the circuitry for eliminating overlap of the high sample rate clocking signal phases and the circuitry for eliminating overlap of the low sample rate clocking signal phases are different circuitry. This causes difficulty in assuming that there is no overlap of the high sample rate pulses used to clock the accumulator and the low sample rate pulses used to clock the succeeding data latch, which difficulty is avoided using the invention Subsampling time-domain digital filters using accumulators are useful in digital communications for example, in pyramid processing. In pyramid processing a digitized signal is analyzed by subsampling filters into its subspectral components for compression using structural codes; the code is transmitted over a relatively low data rate channel; and the subspectral components are decoded, resampled by interpolation and combined to generate a replica of the original digitized signal.

Subsampling time-domain digital filters are also used in oversampling analog-to-digital converters such as those of the delta-sigma type (sometimes referred to as the sigma-delta type). More particularly, an electronic circuit breaker may use such an oversampling analog-to-digital converter followed by digital comparator circuitry and digital filter circuitry to generate trip signals in the presence of a fault condition. This application is focussed on in this specification, but the teachings of this specification have general application to subsampling filters using accumulators, though used for other purposes.

SUMMARY OF THE INVENTION

A clocked bit latch comprising a cascade connection of clocked inverters clocked in progressively delayed, non-overlapping phases of a plural-phase clocking signal can be modified in regard to its clocking signals. These clocking signals differ in that, in one phase of clocking signal, all pulses except every $N^{th}$ pulse are blanked, where N is a positive plural integer. The application of such sparse clocking signal causes the latching rate of the clocked latch to be N times slower. This modified clocked bit latch and plural-bit clocked latches formed from pluralities of such clocked bit latches are subcombinations that are aspects of the invention. Such subcombinations are used for decimation of output samples from subsampling time-domain digital filters constructed in accordance with a further aspect of the invention.

DETAILED DESCRIPTION

Figure 1:
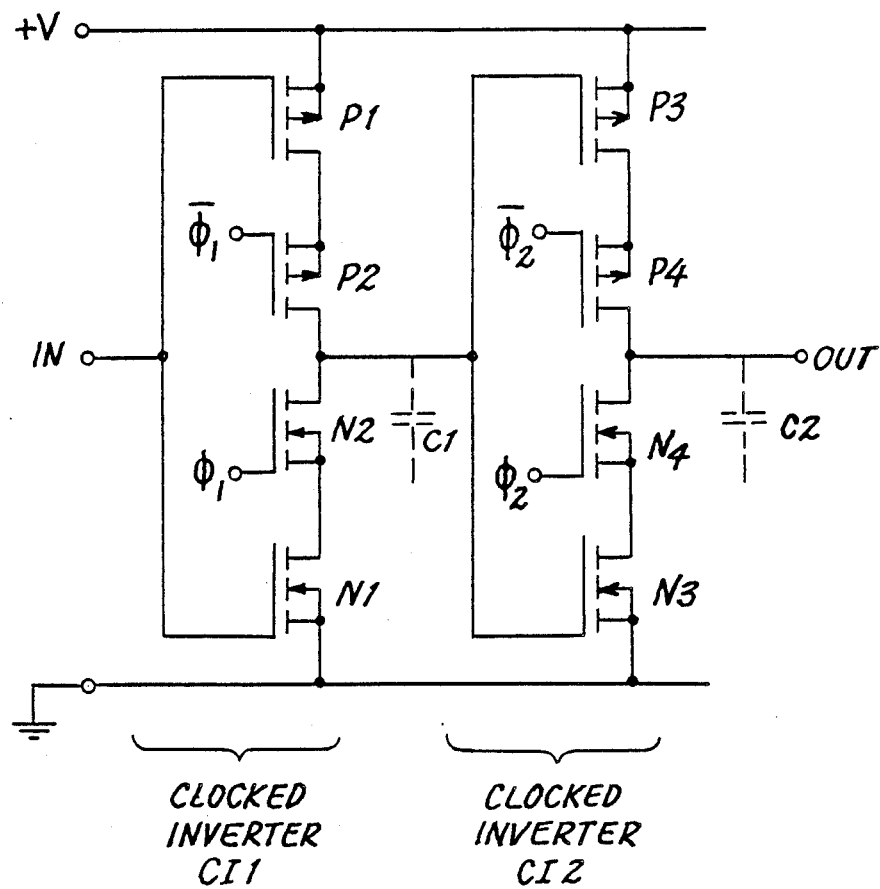
FIG. 1 is a schematic diagram of a clocked bit latch comprising first and second clock inverters in cascade connection, which clocked inverters receive respective clock signals that do not overlap each other, one of said clock signals being sparsely provided respective to the other in accordance with the invention.

FIG. 1 clocked data latch is a clocked bit latch, being only one bit wide, and is formed from the cascade connection of a first clocked logic inverter CI1 and a second clocked logic inverter CI2. Clocked inverters CI1 and CI2 have respective output connections exhibiting capacitances C1 and C2 respectively to their surroundings. The input connection of clocked inverter CI1 is to an input signal terminal IN and its output connection is to the input connection of clocked inverter CI2. The output connection of clocked inverter CI2 is to an output signal terminal OUT. Clocked inverters CI1 and CI2 are both constructed from p-channel and n-channel field effect transistors (FETs) of metal-oxide-semiconductor (MOS) type using a complementary metal- oxide-semiconductor (CMOS) technology. The positive operating supply voltage $+V$ is more than the sum of the threshold voltages of a p-channel FET and an N-channel FET, conventionally being a nominal $+5.0$ volts.

Clocked inverter CI1 includes an n-channel FET N1 and a p-channel FET P1 connected at their gate electrodes to receive an input signal from terminal IN. The input signal is digital, having a value of zero volts in a first logic state and having a value of $+V$ volts in a second logic state. FETs N1 and P1 are selectively connected at their drain electrodes when the drain-to-source paths of an n-channel FET N2 and a p-channel FET P2 also included in clocked inverters CI1 are rendered conductive. This occurs when $\phi_1$ and $\bar{\phi}_1$ clock signals have $+V$ and zero respective voltage values, rather than zero and $+V$ respective voltage values. FETs P1 and N1 then function as a logic inverter. If terminal IN is at $+V$ volts, the capacitance C1 is charged to zero volts by the drain-to-source paths of FETs N1 and P1 being rendered conductive and non-conductive, respectively. Alternatively, if terminal IN is at zero volts, the capacitance C1 is charged to $+V$ volts by the drain-to- source paths of FETs N1 and P1 being rendered non-conductive and conductive, respectively. When the $\phi_1$ and $\bar{\phi}_1$ clock signals subsequently have zero and $+V$ respective voltage values, rather than $+V$ and zero respective voltage values, the drain-to-source paths of FETs N2 and P2 are rendered non-conductive; and the last logic condition imposed on capacitance C1 by simultaneous conduction of FETs N1 and N2 or of FETs P1 and P2 is stored by capacitance C1 until the next time the gate electrodes of FETs N2 and P2 are caused to have $+V$ and zero respective voltage values again rendering their source-to-drain paths conductive.

After at least selected ones of the times a once-inverted logic condition is stored on capacitance C1, a twice-inverted logic condition (corresponding to that originally appearing at terminal IN) is imposed on the capacitance C2 of the output connection of clocked inverter CI2, to appear at terminal OUT of the FIG. 1 clocked latch. This is done responsive to clock signals $\phi_2$ and $\bar{\phi}_2$ having $+V$ and zero respective voltage values rather than zero and $+V$ respective voltage values. Clocked inverter CI2 includes an n-channel FET N3 and a p-channel FET P3 connected at their gate electrodes to respond to the once-inverted logic condition to which the capacitance C1 is charged. FETs N3 and P3 are selectively connected at their drain electrodes to form a further logic inverter when the drain-to-source paths of an n-channel FET N4 and p-channel FET P4 also included in clocked inverter CI2 are rendered conductive responsive to $\phi_2$ and $\bar{\phi}_2$ clock signals having $+V$ and zero respective voltage values. If capacitance C1 is charged to $+V$ volts, the capacitance C2 is charged to zero volts by the drain-to-source paths of N3 and of P3 being rendered conductive and non-conductive, respectively. If capacitance C1 is charged to zero volts, the capacitance C2 is charged to $+V$ volts by the drain-to-source paths of N3 and of P3 being rendered non-conductive and conductive, respectively. In either case the logic condition that appeared on terminal IN during the last time that $\phi_1$ and $\bar{\phi}_1$ clock signals were $+V$ and zero volts, respectively, appears on terminal OUT when the $\phi_2$ and $\bar{\phi}_2$ clock signals are subsequently $+V$ and zero volts, respectively. When the $\phi_2$ and $\bar{\phi}_2$ clock signals subsequently have zero and $+V$ respective voltage values, the drain-to-source paths of N4 and P4 are rendered non-conductive, and the last logic condition imposed on capacitance C2 by simultaneous conduction of FETs N3 and N4 or of FETs P3 and P4 is stored by capacitance C2 until the next time the gate electrodes of FETs N4 and P4 are caused to have $+V$ and zero respective voltage values, again rendering their source-to-drain paths conductive.

Figure 2:
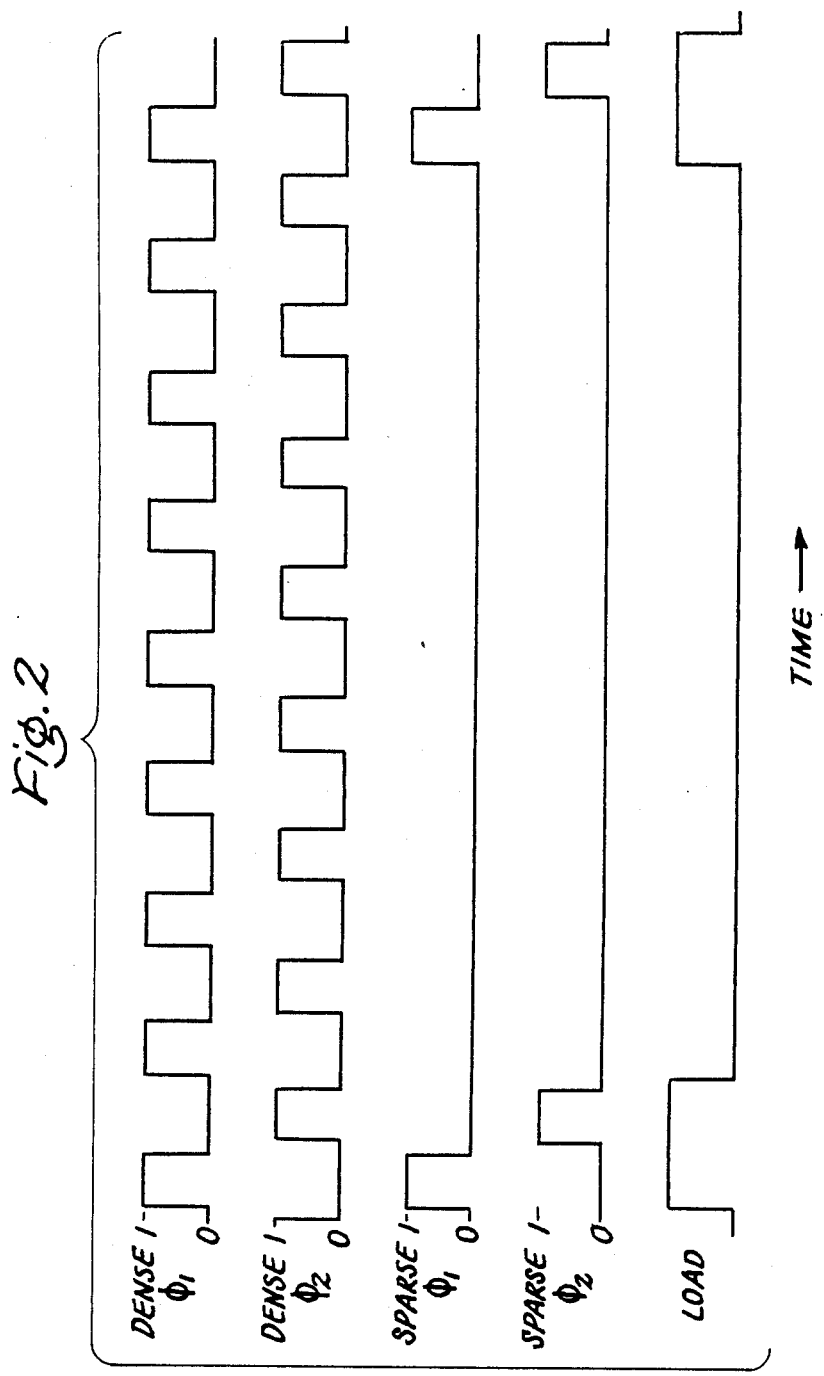
FIG. 2 is a timing diagram of clocking signals that are encountered in the clocked bit latch of FIG. 1.

FIG. 2 shows clocking signals that may be used with the FIG. 1 clocked data latch. A ONE value of a $\phi_1$ and $\phi_2$ clocked signal presumes it to have a $+V$ voltage value and its complementing clock signal to have a zero voltage value, and a ZERO value of a $\phi_1$ or $\phi_2$ clock signal presumes it to have a zero voltage value and its complementing clock signal to have a $+V$ voltage value. In the operation of the FIG. 1 clocked data latch in accordance with the usual prior art practice, the $\phi_1$ and $\phi_2$ clock signals are non-overlapping and alternating as ONE, such as the dense $\phi_1$ and dense $\phi_2$ clock signals shown in FIG. 2. That is, the clock pulses $\phi_1$ and $\phi_2$ occur at the same pulse rate, but their non-overlapping pulses are staggered in phase, with the periods between each successive phase being alike.

In the operation of decimating (or subsampling) circuitry it is desirable to be able to operate a clocked data latch therein at a rate that is a submultiple of the rate of a clocked latch at the output connection of the preceding circuitry. This is advantageously done by employing a blanking procedure to select pulses of the higher rate clocking signals to form the lower rate clocking signals. This avoids the need for providing circuitry for avoiding overlap of clocking pulses at the lower clocking signal rate, in addition to providing circuitry for avoiding overlap of clocking pulses at the higher clocking signal rate. For example, the sparse $\phi_1$ and sparse $\phi_2$ clock signals of FIG. 2 can be generated from the dense $\phi_1$ and $\phi_2$ clock signals, respectively, by blanking all pulses except every eighth ones of each signal. The input connection to the input clocked latch in the decimating, or subsampling, circuitry will then be in close temporal alignment with each eighth datum in the output connection of the output clocked latch in the preceding circuitry.

The operation of the FIG. 1 clocked data latch is of such nature, however, that it is unnecessary to blank pulses in both the dense $f_1$ clock signal and the dense $\phi_2$ clock signal, if decimated operation is sought. Using every pulse of one of the dense $\phi_1$ and dense $\phi_2$ clocking signals as a first clocking signal for the FIG. 1 clocked data latch and every eighth pulse of the other of the dense $\phi_1$ and dense $\phi_2$ clocking signals as a second clocking signal for the FIG. 1 clocked data latch produces the same decimation result at terminal OUT.

More particularly, assuming dense $\phi_1$ and sparse $\phi_2$ clocking signals to be applied to the FIG. 1 clocked data latch, the initial 1 clock pulse implements charging of capacitance C1 to an inverted response to a logic condition at terminal IN, and the ensuing $\phi_2$ clock pulse implements charging of capacitance C2 to an inverted response to this inverted response on C1—i.e., to a replica of the original logic condition at terminal IN. Thereafter, the next seven $\phi_1$ clock pulses implement charging of capacitance C1 to inverted responses to each successive current logic condition at terminal IN. However, these next seven $\phi_1$ clock pulses are not followed by a subsequent $\phi_2$ clock pulse before the next $\phi_1$ clock pulse occurs, so N4 and P4 remain nonconductive and there is no change (except for droop) in the charge on capacitance C2. These seven intervening $\phi_1$ clock pulses are ineffective to change response at terminal OUT of the FIG. 1 clocked data latch.

Alternatively, assuming sparse $\phi_1$ and dense $\phi_2$ clocking signals to be applied to the FIG. 2 clocked latch the initial $\phi_1$ clock pulse implements charging of capacitance C1 to an inverted response to a logic condition at terminal IN, and the ensuing $\phi_2$ clock pulse implements charging of capacitance C2 to an inverted response to the inverted response on C1—i.e., to a replica of the original logic condition at terminal IN. Thereafter, the next seven $\phi_2$ clock pulses implement recharging of capacitance C2 to inverted response to the same inverted response at C1, so the replica of the original logic condition a terminal IN continues to be maintained. These seven intervening $\phi_2$ clock pulses are ineffective in affecting response at terminal OUT of the FIG. 1 clocked data latch.

Decimation of parallel-bit signals to generate parallel-bit signals can be carried out using a plurality of FIG. 1 single-bit clocked data latches with their terminals IN receiving respective bits of the parallel-bit signal to be decimated, with their clocking signals being applied in parallel, and with their terminals OUT supplying respective bits of the decimated parallel-bit signal. However, it is usually preferable to convert the decimated response to serial-bit form. The reduced word rate associated with decimation permits slower processing of each word, and the use of the same apparatus to process on a time-division-multiplex basis each bit of decimation result usually conserves digital hardware.

Figure 3:
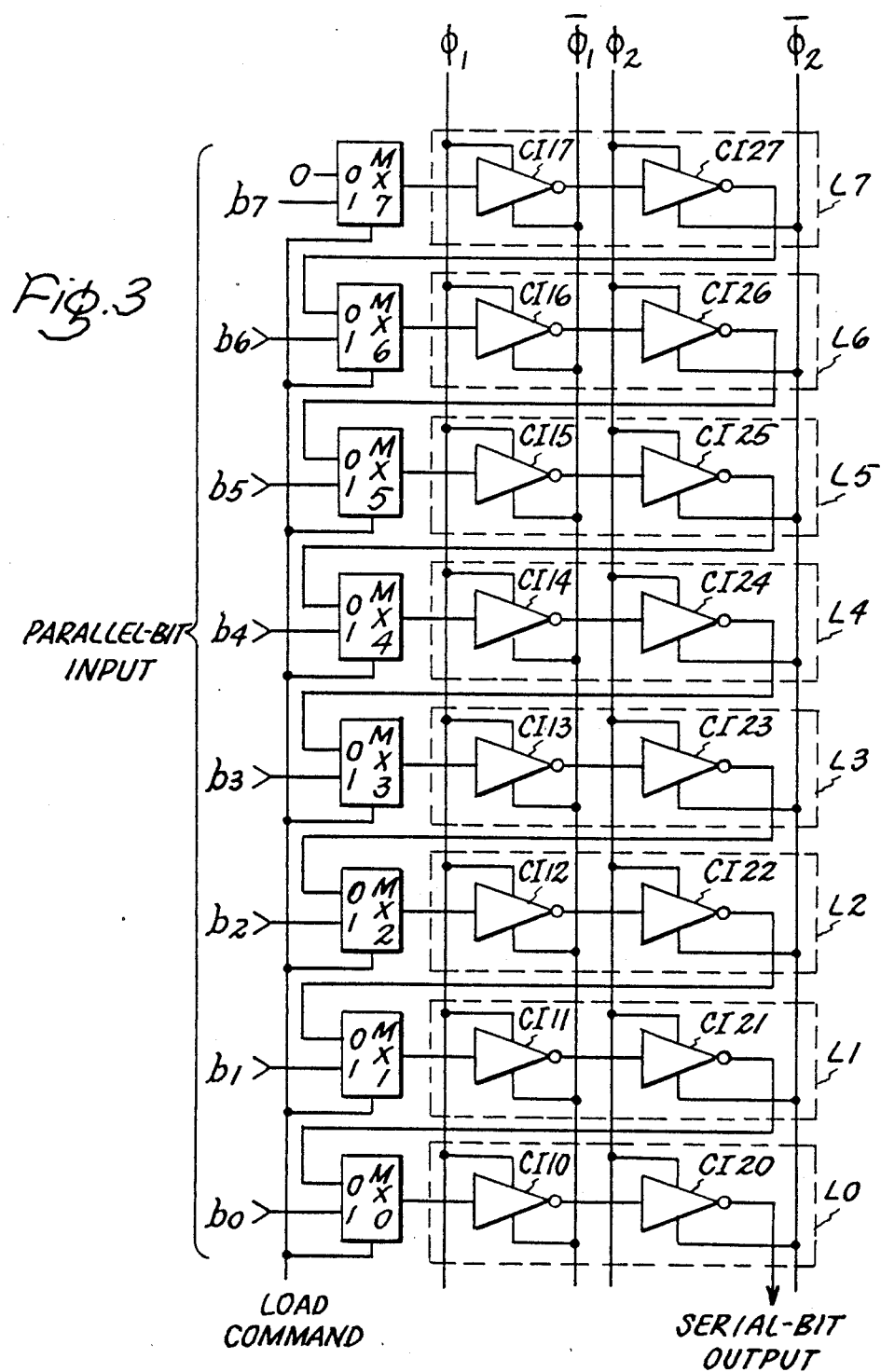
FIG. 3 is a schematic diagram of a parallel- in/serial-out (PISO) register that can be constructed using clocked bit latches as shown in FIG. 1.

FIG. 3 shows how eight clocked bit latches L0, L1, L2, L3, L4, L5, L6, L7 per FIG. 1 can be connected together using multiplexers MX0, MX1, MX2, MX3, MX4, MX5, MX6 and MX7 to provide a parallel-in/serial-out (PISO) register that decimates a parallel-bit signal and generates the decimation response in serial-bit format. Each clocked bit latch LM (where M is a variable having the values 0, 1, 2, 3, 4, 5, 6, 7) comprises a respective first clocked inverter CI1M and a respective second clocked inverter CI2M in cascade connection. The clocked inverters CI1M each receive $\phi_1$, $\overline{\phi}_1$ clock signal; and the clocked inverters CI2M each receive $\phi_2$, $\overline{\phi}_2$ clock signal. The $\phi_1$ and $\phi_2$ clock pulses are non-overlapping, the set of sparse clock pulses occurring at eight times the rate the LOAD pulses occur. The denser clock pulses in the other set occur at a multiple of the rate the sparse clock pulses. When LOAD pulses occur, each multiplexer MXM selects a respective bit $b_M$ of the parallel-bit input signal for application to the corresponding clocked latch LM. At times a LOAD pulse does not occur, each multiplexer MXM except MX7 selects the output bit from the preceding clocked latch L(M+1) to be applied as input bit to the succeeding clocked latch LM. Multiplexer MX7 selects a ZERO to be applied as input bit to the succeeding clocked latch L7. The LOAD pulse is valid at least from the initial edge of a $\phi_1$ pulse during which loading is to occur until after that $\phi_1$ pulse continues to occur.

Figure 4:
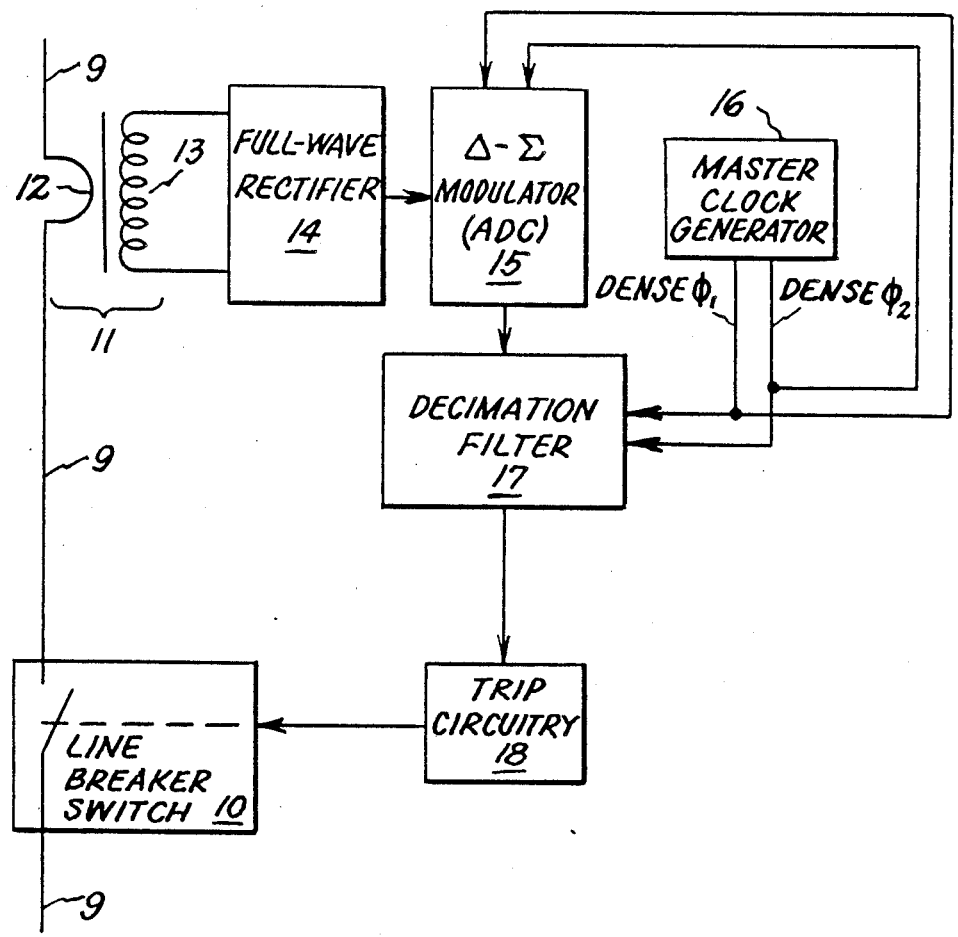
FIG. 4 is a schematic diagram of an electronic circuit breaker including, a subsampling time-domain digital filter. Each of FIGS. 5, 6, 7 and 8 is a schematic diagram of a subsampling time-domain filter that embodies the invention and that can be used in the FIG. 4 electronic circuit breaker that embodies the invention in a further aspect thereof.

The FIG. 4 electronic circuit breaker selectively interrupts conduction through a power conductor 9. This is done using a line breaker switch 10, which interrupts conduction through conductor 9 when an overcurrent condition is sensed. Sensing of the current flow in conductor 9 is shown as being done, by way of example, using a current transformer 11 having a primary winding 12 thereof inserted into conductor 9 and having a secondary winding 13 thereof connected to the input port of full-wave rectifier 14. Rectified response to line current is supplied by rectifier 14 from its output port to the input port of an oversampling analog-to-digital converter (or ADC) 15. ADC 15 is of the so-called "delta-sigma" modulator type, sometimes referred to as the "sigma-delta" modulator type.

Delta-sigma modulators have been used in analog-to-digital converters for some time. The reader is referred to the following technical articles incorporated herein by reference.

(1) "A Use of Limit Cycle Oscillators to obtain Robust Analog to Digital Converters", J. G. Candy, IEEE TRANSACTIONS ON COMMUNICATIONS, Vol. COM-27, No. 3, pp. 298–305, March 1974.

(2) "Using Triangularly Weighted Interpolation to Get 13-Bit PCM from Sigma-Delta Modulator", J. G. Candy, et al., IEEE TRANSACTIONS ON COMMUNCATIONS, Vol. COM-24, No. 11, pp. 1268–1275, November 1976.

(3) "A Use of Double Integration in Sigma Delta Modulation", J. G. Candy, IEEE TRANSACTIONS ON COMMUNICATIONS, Vol. COM-33, No. 3, pp. 249–258, March 1985.

(4) "Circuit and Technology Considerations for MOS Delta-Sigma A/D Converters", M. W. HAUSER, et al 1986, IEEE INTERNATIONAL SYMPOSIUM ON CIRCUITS AND SYSTEMS PROCEEDINGS, pp. 1310–1315, May 1986.

(5) "A Low-Noise Chopper-Stabilized Differential Switched-Capacitor Filtering Technique", K.-C. Hsieh, et al., IEEE JOURNAL OF SOLID-STATE CIRCUITS, Vol. SC-16, No. 6, pp. 708–715, December 1981.

In a delta-sigma modulator an analog input signal has a quantized analog signal subtracted therefrom to generate an error signal. This error signal is integrated over time, and the resulting integral is supplied to a quantizer to be digitized. The quantizer includes means for generating the quantized analog signal as well, such as digital-to-analog converter for the digital signal from the quantizer, completing a direct feedback connection. The delta-sigma modulator is operated at a relatively high sample rate $f_s$ compared to the rate $f_{out}$ at which an interpolated value of digitized input signal is to be developed as a final output signal of the analog-to-digital converter. The digital output signal from the quantizer of the delta-sigma modulator is then subjected to averaging over cycle of repeated operations of the delta-sigma modulator, $f_s/f_{out}$ in number. This averaging may be done by accumulating the digital output from the quantizer over $(f_s/f_{out})$ operations, then dividing the accumulation by $(f_s/f_{out})$ to obtain an interpolated value of the digitized input signal as output signal. This division is a simple matter of binary place shifting when $(f_s/f_{out})$ is an integral power, N, of two. This paragraph has described a first-order delta-sigma modulator, with a single integrator included in the direct feedback loop, per the March 1974 J. G. Candy article, being used to implement an oversample and decimate analog-to-digital converter.

One may view the averaging to obtain the interpolated value of the digitized input signal as being a low-pass digital filtering procedure used to suppress quantizing noise, which is above-band. Low-pass filtering techniques for suppressing quantizing noise that are more sophisticated than the simple accumulate- and-divide technique are known—e.g., from the November 1976 Candy et alii article which describes triangularly weighted kernels for such filtering. With ideal low-pass filtering for suppressing quantizing noise, effectively the number N of bits of resolution in the output signal of the prior-art analog-to-digital converter using a first-order delta-sigma modulator is approximately $[1.5 \log_2(f_s/f_{out})] - 0.9$.

In addition to first-order delta-sigma modulators, delta-sigma modulators with additional integrating loops are also possible. This is described in the March 1985 J. G. Candy article.

As pointed out by Hauser et alii, there are many different forms of oversample and decimate analog-to-digital converters, but those of especial interest are the ones where the error signal is forced to have single-bit resolution, inasmuch as this avoids the need for precision binary elements in the digital-to-analog converter used to complete the feedback loop. The goal is to obtain maximum precision in the analog-to-digital process with minimal requirement for precision in the circuit elements employed in the analog-to-digital converter.

Hsieh et alii point out that achievement of this goal is furthered by the use of differential chopper-stabilized configurations, particularly in switched-capacitor designs using metal-oxide-semiconductor field effect transistors (MOSFETs) as switches. Chopper stabilization of the differential amplifier in the integrator also translates its low-frequency, or 1/f, noise above-band where it is suppressed by the delta-sigma modulator output signal digital filter.

A preferred form for the delta-sigma modulator 15 to take is described by S. E. Noujaim in U.S. Pat. No. 4,768,018 issued 30 August 1988, entitled "ANALOG TO DIGITAL CONVERTER FOR AN ELECTRONIC CIRCUIT BREAKER WITH OUT-OF-SUPPLY-RANGE INPUT SIGNALS", and assigned to General Electric Company. A preferred form for the full-wave rectifier 14 to take when used in conjunction with the delta-sigma modulator 15 is described in allowed U.S. patent application Ser. No. 377,373 filed 10 July 1989 by P. L. Jacob, entitled "ELECTRONIC CIRCUIT BREAKER USING DIGITAL CIRCUITRY HAVING INSTANTANEOUS TRIP CAPABILITY", and assigned to General Electric Company.

A master clock generator 16 generates two non-overlapping phases $\phi_1$ and $\phi_2$ of clocking signal at $f_s$ rate to be supplied to the delta-sigma modulator 15 and to its digital output filter 17. Trip circuitry 18 generates a trip signal responsive to the filter 17 digital output signal indicating the current flow through power conductor 9 to be excessive, which trip signal causes line breaker switch 10 to interrupt conduction through power conductor 9.

FIGS. 5, 6, 7 and 8 show alternative configurations for filter 17, which filter is of primary concern insofar as the invention is concerned. Filter 17 is of input-weighted type in which successive samples supplied to its input port from ADC 15 are weighted by a weighting circuit 19, which may by way of example be simply a straight-through wire connection weighting each successive sample by unity. Then the successively supplied and weighted samples are accumulated in an accumulator 20, periodically generating filter response samples at $f_{out}$ rate and being reset immediately thereafter to discard previous accumulation results. Reset signals for accumulator 20 are generated using a binary counter 21. The filter response samples periodically generated at $f_{out}$ rate by accumulator 20 are intermixed with other samples and are selected from these other samples by a clocked data latch operated as a decimator. A decimator responds to a LOAD signal, which is the FINAL carry bit provided from binary counter 21, to select to itself as an N-parallel-bit input sample every $(2^N)^{th}$ sum output sample from accumulator 20. These samples are then supplied in serial-bit form to trip circuitry 18 to be compared with acceptable levels of signal, to determine whether or not the samples from decimator 22 represent excessive levels of current flow through line conductor 9. If they do, trip circuitry 18 issues a trip signal that causes line breaker switch 10 to interrupt current conduction through conductor 9. This decimator is shown in FIGS. 5, 6, 7 and 8 in respective forms 22, 23, 24 and 25. Decimator 22 or 24 is used when the trip circuitry 18 in the FIG. 4 electronic circuit breaker is of a form utilizing serial-bit input signal, and decimator 23 or 25 is used when the trip circuitry 18 is of a form utilizing parallel-bit input signal.

Figure 5:
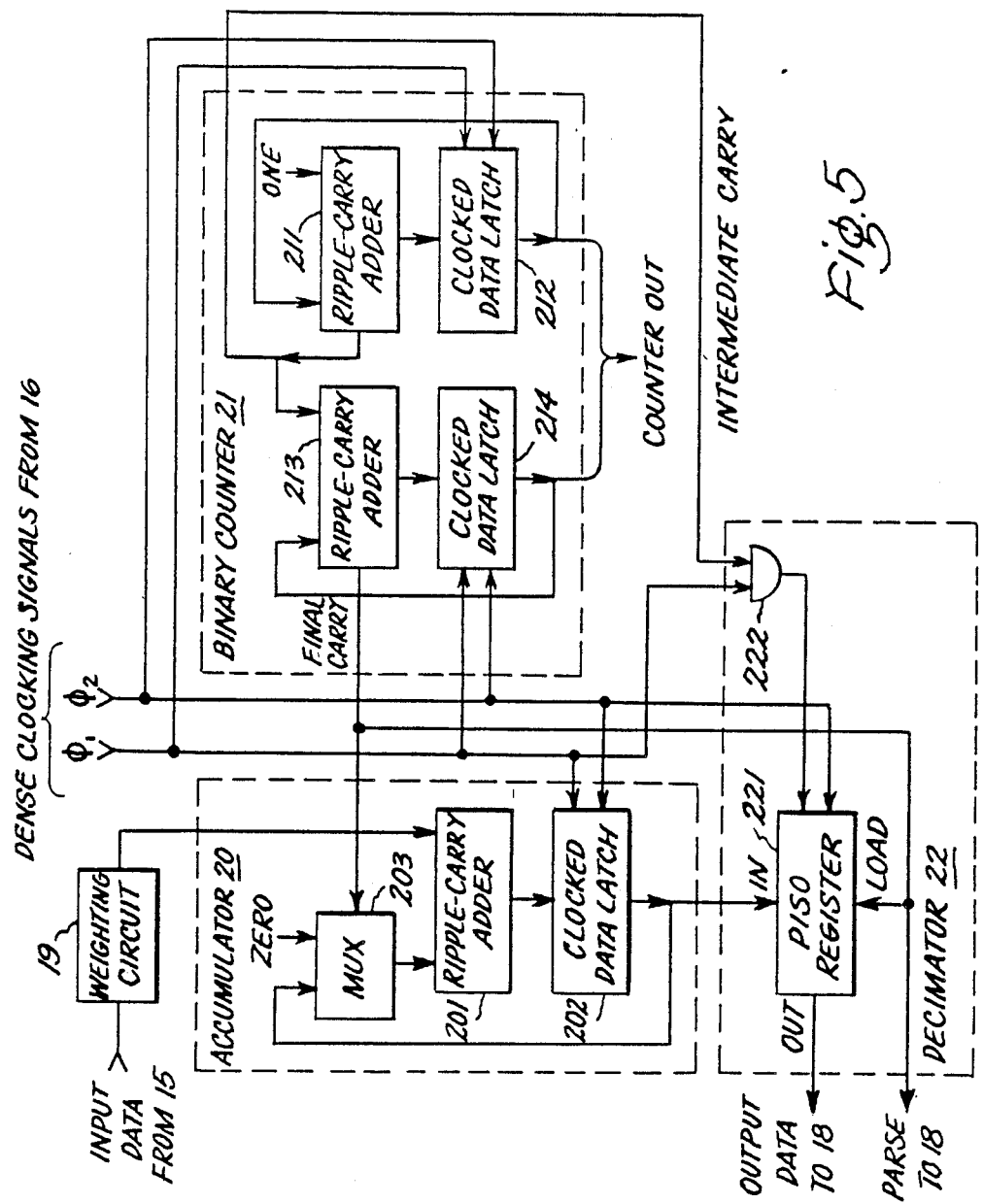

Considering the FIG. 5 configuration for decimation filter 17, a binary counter 21 counts to $2^N$ on a modular basis, where $2^N$ is the number of samples in the filter kernel. Binary counter 21 includes an adder 211 connected to accumulate a succession of arithmetic ones, as addends with accumulation being provided for by a clocked data latch 212 applying as augend to adder 211 its sum output as delayed by a full sample interval at $f_s$ rate. The clocked data latch 212 comprises two ranks of clocked inverters in cascade, clocked inverters in the earlier rank being clocked by $\phi_1$ phase going high and the clocked inverters in later rank being clocked by $\phi_2$ phase going high. Each rank of clocked inverters delays samples a half sample time at $f_s$ rate. After N counts or full sample times of $f_s$, adder 211 generates a carry (or overflow) for the next full sample interval at $f_s$ rate. For simplicity, N is presumed to be an integral power of two, such as eight. This intermediate carry signal is the addend input signal for a further adder 213 also connected for accumulation, its accumulation being provided for by a further clocked data latch 214 supplying as augend input signal to adder 213 its sum output as delayed by a full sample interval at $f_s$ rate. The clocked data latch 212 comprises two ranks of clocked inverters in cascade, clocked inverters in the earlier rank being clocked by $\phi_1$ going high and clocked inverters in the later being clocked by $\phi_2$ going high. After $2^N$ counts by binary counter 21, adder 213 generates a final carry (or overflow), for the next full sample interval at $f_s$ rate. The final carry signal is supplied as a ONE at $f_{out}$ rate and is used as reset signal for the accumulator 20.

The accumulator 20 includes an adder 201 receiving as addend input data the ADC 15 output samples at $f_s$ rate after their having been weighted in weighting circuit 19. The sum output of adder 201 is subjected to a full sample delay at $f_s$ rate by a clocked latch 202 to be selectively supplied as augend input to adder 201. The selection of augend input for the adder 201 is made by a multiplexer 203 which selects arithmetic zero as augend input responsive to final carry output from adder 211 being an overflow ONE furnished as reset signal. If adder 213 does not overflow, so final carry signal is a ZERO, multiplexer 203 selects as the augend input of adder 201 its sum output as delayed one full sample at $f_s$ rate by clocked data latch 202.

ADC 15 clocks forward its output sample on the same clock phase $\phi_2$ as clocked data latches 212 and 214 do their output samples. There is sufficient time for both inputs to adder 201 and its sum output to settle before its sum output is clocked forward into clocked data latch 202 on the following $\phi_1$ clock phase. This is so, despite time being taken for carry bits to ripple through adders 211 and 213 to the final carry output, which when the final carry bit is a ONE delays multiplexer 203 from selecting zero as an input to adder 201.

The decimator 22 selects its input samples in parallel-bit form from accumulator 20 and subsequently supplies the same samples converted to serial-bit form as its output samples to trip circuitry 18. An electronic circuit breaker designed for providing delayed, rather than instantaneous trip, for either 50 Hz or 60 Hz power should have a filter kernel the integral multiple of which spans an integral number of complete cycles whichever frequency power is being monitored. This is so overcurrent protection is not supplied in differing amount for different phasings of filter kernel vis a vis current alternations in line conductor 9. (The kernel of a filter is the pattern of weights applied to a contiguous group of input samples.) An oversampling frequency of 3.56352 MHz for a $2^8$-sample wide filter kernel provides a 13.92 kHz word rate at the output of accumulator 20 and is suitable for 50 or 60 Hz power monitoring. Each of these words is eight bits wide, presuming the weighting network 19 applies unity weights, so the words are free of binary fraction components. Clocking out the eight bits of each successive word serially requires a clock-out rate of 111.36 kHz. Accordingly, the counter 21 is designed to count at 3.56352 MHz rate, to furnish an intermediate carry as one output signal every $2^5$ counts and to furnish a final carry as another output signal every $2^8$ counts. More generally, binary counter 21 counts to $2^N$ on a modular basis furnishing an intermediate carry signal each $(2^N/N)^{th}$ count and a final carry signal each $(2^N)^{th}$ count.

In decimator 22 the final carry conditions a parallel-in/serial-out register 221 (of the type described in connection with FIG. 3) to load respective stages thereof in parallel with respective bits of the accumulator 20 output signal. Thereafter the stages of register 221 are connected in cascade to function as a shift register for shifting out the stored bits serially to trip circuitry 18. This shifting is done by register 221 responsive to a sparse $\phi_1$ clock phase that is generated by an AND gate 222 responsive to both the dense $\phi_1$ clock phase from master clock generator 16 being a ONE and the intermediate carry signal from adder 211 being a ONE. The action of AND gate 222 is such that any tendency of the intermediate carry signal provided by counter 21 to overlap the $\phi_2$ clock signal pulse that it is supposed to precede is ineffective to extend a sparse $\phi_1$ clock signal pulse supplied from AND gate 222 past the duration of the dense $\phi_1$ clock signal pulse supplied as an input signal to AND gate 222. Any tendency of the final carry signal to overlap the $\phi_2$ signal it is supposed to precede is ineffective to disrupt operation because load-ing of PISO register 221 cannot continue after a sparse $\phi_1$ clock signal pulse is past. AND gate 222 generates a ONE to form a sparse $\phi_1$ clock pulse only every eighth dense $\phi_1$ clock phase from master clock generator 16, causing its clock rate to be one-eighth the 3.56352 MHz rate of the dense $\phi_1$ clock signal. That is, the sparse $\phi_1$ clock rate is 111.36 kHz, as required. The final carry from adder 213 is supplied to trip circuitry 18 to provide a parsing signal that indicates when words of the serial-bit data from register 221 beginning and end.

If trip circuitry 18 is simply a digital comparator comparing filter 17 output signal against a threshold value and generating a trip signal when the threshold value is exceeded, the serial-bit data from PISO register 221 is preferably supplied in order of decreasing bit significance, to allow simple bit by bit comparison. In such case bits $b_0$, $b_1$, $b_2$, $b_3$, $b_4$, $b_5$, $b_6$ and $b_7$ are progressively less significant bits of clocked data latch 202 output signal. Trip circuitry 18 in more sophisticated designs subtract various thresholds from filter 17 response and integrates the differences over various times to determine when trip signal should be generated. Subtraction using ripple carry is most readily implemented if the serial-bit data from PISO register 221 is supplied in order of increasing bit significance. In such case bits $b_0$, $b_1$, $b_2$, $b_3$, $b_4$, $b_5$, $b_6$ and $b_7$ are progressively more significant bits of clocked data latch 202 output signal.

Consider how portions of claim 6, which follows this specification, describe the FIG. 5 decimator 22 circuitry. In the PISO register 221 the first clocked logic inverters precede the second clocked logic inverters in their cascade connections, and the $\phi_1$ and $\phi_2$ clock signals are viewed as a first pulse train and a second pulse train, respectively. AND gate 222 responding only to those $\phi_1$ clock signal pulses supplied at dense pulse rate from the master clock generator 16 that are coincidental with the intermediate carry signal from the binary counter 21 provides a means for applying, to the clock ports of said first clocked logic inverters, responses to only each $(2^N/N)^{th}$ ones of the pulses in the first train. The $\phi_2$ clock line supplying $\phi_2$ clock signal pulses at dense pulse rate from the master clock generator 16 provides a means for applying the pulses in the second train to the clock ports of said second clocked logic inverters. The connection that applies the final carry signal from the binary counter 21 as load command signal to the PISO register 221 provides a means for applying control signals to the control connections of the multiplexers in PISO register 221 that condition them to select to their respective output connections responses to the bits received at their respective input connections, only each $N^{th}$ time the first clocked bit latch connecting directly from the multiplexer output connection receives a $(2^N/N)^{th}$ one of the pulses in the first train.

Figure 6:
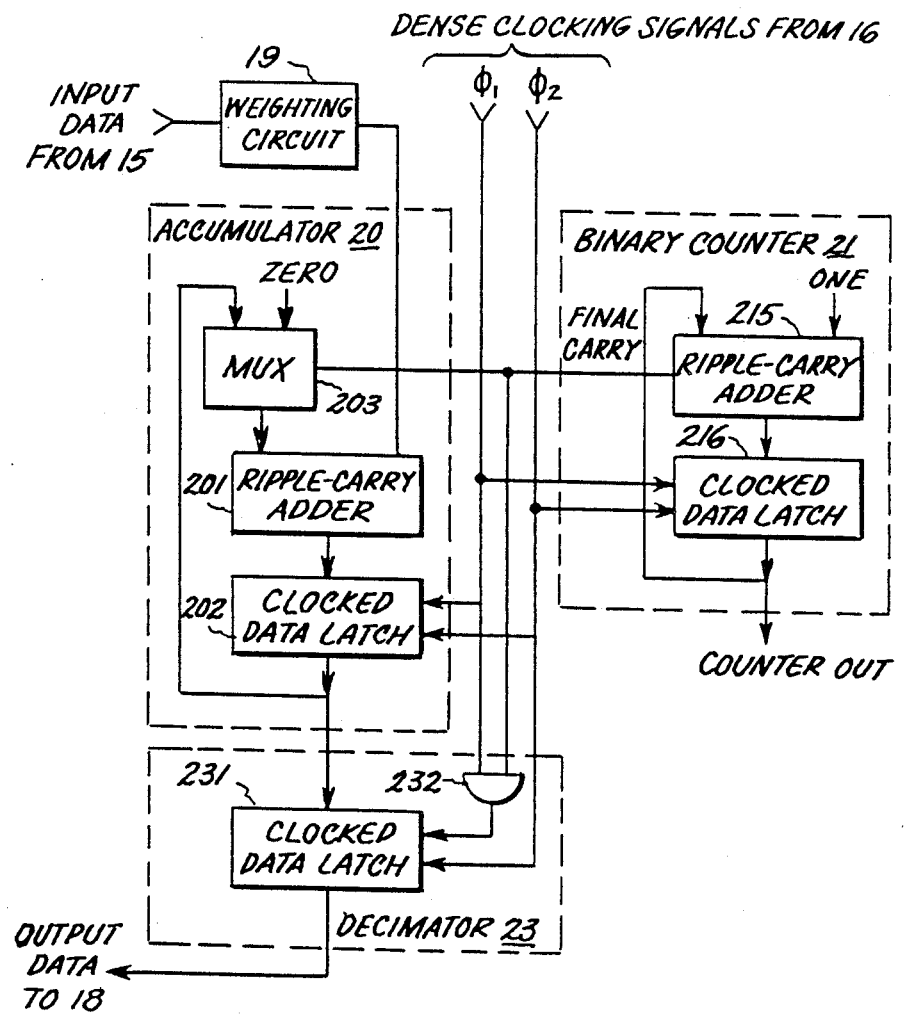

FIG. 6 shows decimation filter 17 circuitry suitable for an electronic circuit breaker having trip circuitry 18 that accepts parallel-bit, rather than serial-bit, input data. Accordingly, the decimator 23 is not of a type that converts parallel-bit data from clocked data latch 202 to serial-bit form. A clocked data latch 231 is used in decimator 23 instead of the PISO register 221 used in decimator 22. The clocked data latch 231 includes an initial rank of clocked inverters responding to clocked latch 202 output signal and receiving sparse $\phi_1$ clock signal from an AND gate 232, responsive to final carry signal being supplied from adder 213 simultaneously with dense $\phi_1$ clock signal from master clock generator 16 being a ONE. The action of AND gate 232 is such that any tendency of counter 21 to generate a final carry signal that overlaps the $\phi_2$ clock signal pulse it is supposed to precede is ineffective to extend the sparse $\phi_1$ clock signal pulse supplied from AND gate 232 past the duration of the dense $\phi_1$ clock signal pulse supplied as an input signal to AND gate 232. The clocked latch 231 further includes another rank of clocked inverters, receiving dense $\phi_2$ clock signal from master clock generator 16, being in cascade connection after the initial rank of clocked inverters, and supplying the clocked data latch 231 parallel-bit output signal to trip circuitry 18.

In the FIG. 6 decimation filter there is no need to extract an intermediate carry from binary counter 21. Accordingly, binary counter 21 is represented somewhat differently in FIG. 6. An adder 215 combines the component adders 211 and 213 of FIG. 5, and a clocked data latch 216 combines the component clocked latches 212 and 214. Considering binary counter 21 in this way simplifies further consideration of how binary counter 21 and accumulator 20 interact. This interaction which will now be explained in greater detail, is similar in the FIG. 5 decimation filter.

In binary counter 21 as shown in FIG. 6 the adder 215 supplies a 1111 1111 sum signal (in unsigned binary numbers) to clocked data latch 216 during the same $\phi_1$ clock signal pulse that the adder 201 in accumulator 20 supplies the accumulation of $2^8$ samples from weighting network 19 to clocked data latch 202. These signals are advanced to the output connections of the initial ranks of clocked inverters in clocked data latches 216 and 202 during this $\phi_1$ clock signal pulse, there to be temporarily stored. On the succeeding $\phi_2$ clock signal pulse these signals are further advanced to the output connections of the final ranks of clocked inverters in clocked data latches 216 and 202, there to be temporarily stored. The accumulation of $2^8$ samples temporarily stored at the output connection of clocked data latch 202 will be clocked into clocked data latch 231 in decimator 23 (or into PISO register 221 in decimator 22 of the FIG. 5 decimation filter) on the succeeding $\phi_1$ clock signal pulse, assuming the final carry out signal from binary counter 21 is a ONE at that time. Adder 215 responds to the 1111 1111 signal supplied to it as augend signal from the output connection of clocked data latch 216 and to the 0000 0001 arithmetic one signal continuously supplied to it as its addend signal to supply a ONE as overflow or final carry signal and 0000 0000 as sum signal to clocked data latch 216. This ONE is supplied for the remainder of the $\phi_2$ clock signal pulse after the carries have rippled through adder 215 and during the succeeding $\phi_1$ clock pulse. Multiplexer 203 in accumulator 20 responds to this ONE to select against the accumulator output signal temporarily stored at the output connection of clocked data latch 202 and to select its arithmetic zero input instead as augend input signal for adder 201. Adder 201 sum signal equals then, the initial sample of a subsequent set of $2^8$ samples to be accumulated, an accumulation procedure that takes the two-hundred-fifty-five additional counts to again reach 1111 1111 sum signal from adder 215.

Consider how portions of claim 14, which follows this specification, describe the FIG. 6 decimator 23 circuitry. In the clocked data latch 231 the first clocked logic inverters succeed the second clocked logic inverters in their cascade connections, and the $\phi_2$ and $\phi_1$ clock signals are viewed as a first pulse train and a second pulse train, respectively. The $\phi_2$ clock line supplying $\phi_2$ clock signal pulses at dense pulse rate from the master clock generator 16 provides a means for applying the pulses in the first train to the clock ports of the first clocked logic inverters. AND gate 232, responding only to those $\phi_1$ clock signal pulses supplied at dense pulse rate from the master clock generator 16 that are coincidental with the final carry signal from the binary counter 21, provides a means for applying responses to only each $(2^N)^{th}$ ones of the pulses in the second train to the clock ports of the second clocked logic inverters.

Figure 7:
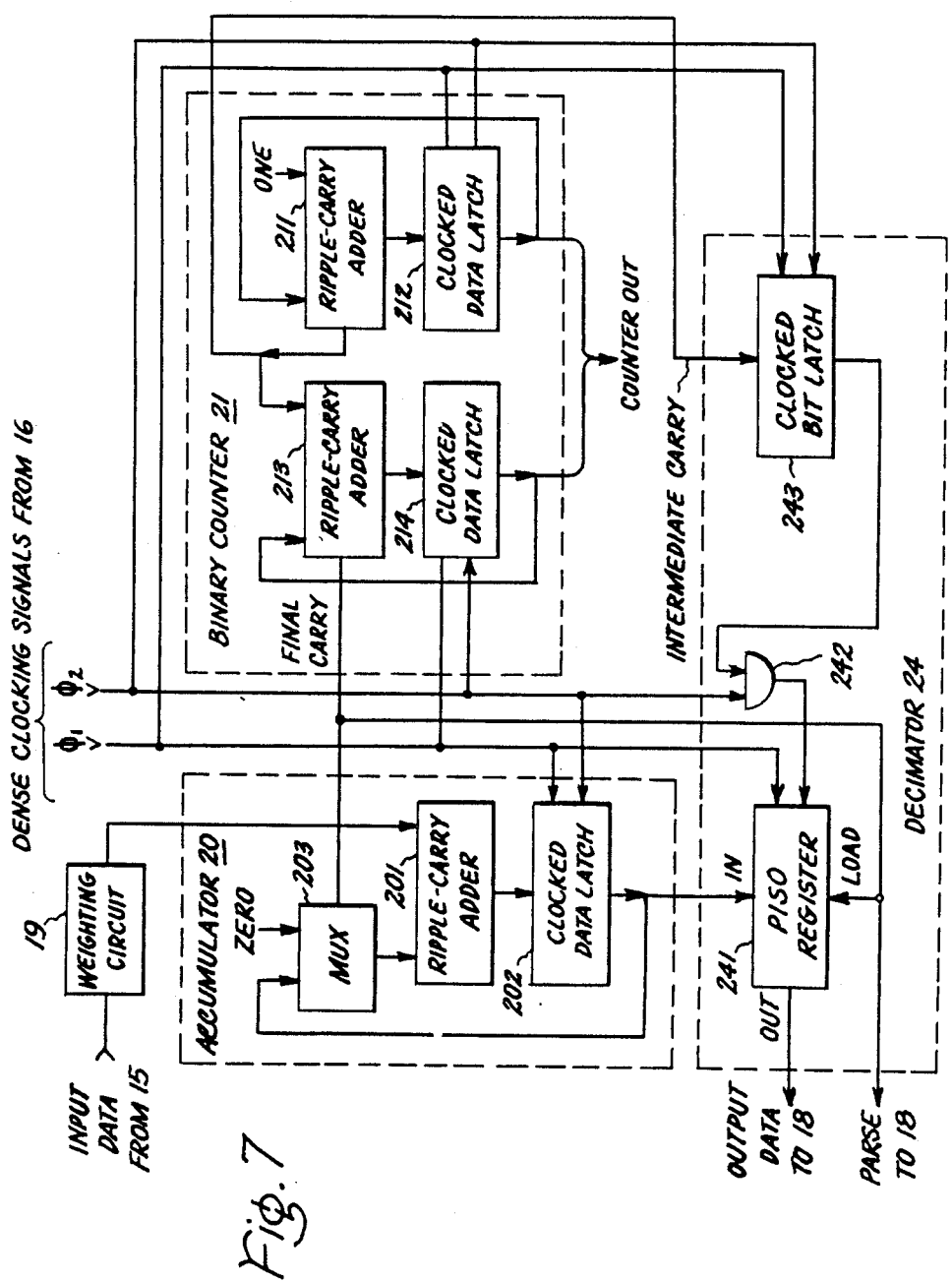

FIG. 7 shows a variant of the FIG. 5 decimation filter using a decimator 24 that differs from decimator 22 in using sparse $\phi_2$ clocking signal, rather than sparse $\phi_1$ clocking signal. A PISO register 241 in decimator 24 has the same structure as PISO register 221, but receives dense $\phi_1$ clock signal from master clock generator 16 and sparse $\phi_2$ clock signal from an AND gate 242. AND gate 242 responds with an output ONE when dense $\phi_2$ clock signal is ONE at the same time that the intermediate carry bit supplied from counter 21 and subsequently delayed half a sample time at $f_s$ to be by a clocked bit latch 243 is a ONE. The action of AND gate 242 is such that any tendency of counter 21 to provide intermediate carry signal that overlaps an $\phi_1$ clock signal pulse is ineffective to extend a sparse $\phi_2$ clock signal pulse supplied from AND gate 242 past the duration of the dense $\phi_2$ clock signal supplied to AND gate 242 as an input signal. This avoids loading on the next $\phi_1$ clock signal pulse, even if the final carry bit from counter 21 overlaps it owing to delay in carry ripple-through.

Consider how portions of claim 6, which follows this specification, describe the FIG. 7 decimator 24 circuitry. In the PISO register 241 the first clocked logic inverters succeed the second clocked logic inverters in their cascade connections, and the $\phi_2$ and $\phi_1$ clock signals are viewed as a first pulse train and a second pulse train, respectively. AND gate 242, responding only to those $\phi_2$ clock signal pulses supplied at dense pulse rate from the master clock generator 16 that are coincidental with the immediate carry signal from the binary counter 21, as delayed in the clock bit latch 243 provides a means for applying, to the clock ports of said first clocked logic inverters, responses to only each $(2^N/N)^{th}$ ones of the pulses in the first train. The $\phi_1$ clock line supplying $\phi_1$ clock signal pulses at dense pulse rate from the master clock generator 16 provides a means for applying the pulses in the second train to the clock ports of said second clocked logic inverters. The connection that applies the final carry signal from the binary counter 21 as load command signal to the PISO register 241 provides a means for applying control signals to the control connections of the multiplexers in PISO register 241 that condition them to select to their respective output connections responses to the bits received at their respective input connections, only each $N^{th}$ time the first clocked bit latch connecting directly from the multiplexer output connection receives a $(2^N/N)^{th}$ one of the pulses in the first train.

Figure 8:
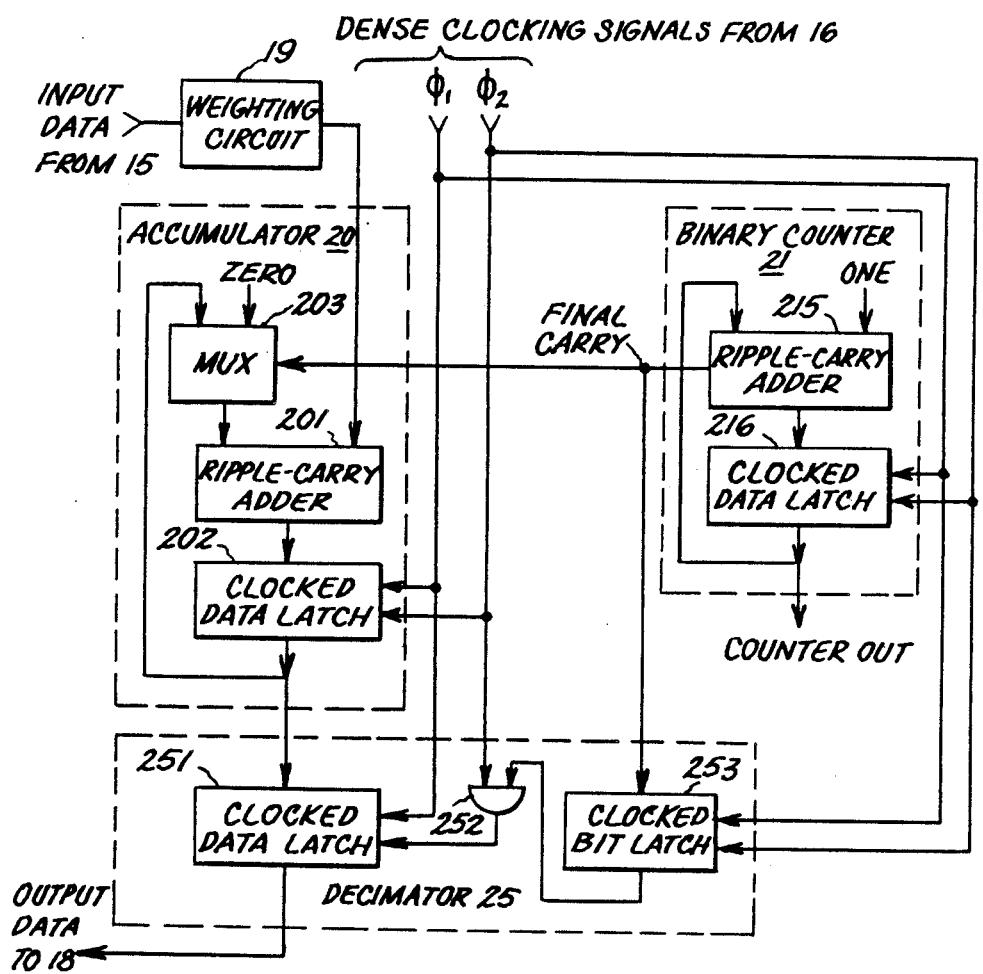

FIG. 8 shows a variant of the FIG. 6 decimation filter using a decimator 25 that differs from decimator 23 in using sparse $\phi_2$ clocking signal, rather than sparse $\phi_1$ clocking signal. A clocked data latch 251 in decimator 25 has the same structure as the clocked data latch 231 in decimator 23, but an initial rank of clocked inverters in data latch 251 receives dense $\phi_1$ clock signal from master clock generator 16 and a final rank of clocked inverters in data latch 251 receives sparse $\phi_2$ clock signal from an AND gate 252. AND gate 252 responds with an output ONE when dense $\phi_2$ clock signal is a ONE at the same time that the intermediate carry bit supplied from counter 21 and subsequently delayed a half sample time at $f_s$ rate by a clocked bit latch 253 is a ONE, providing protection against misloading clocked data latch 251 similar to that AND gate 242 provides clocked data latch 241 in the FIG. 7 decimation filter.

Consider how portions of claim 14, which follows this specification, describe the FIG. 8 decimator 25 circuitry. In the clocked data latch 251 the first clocked logic inverters precede the second clocked logic inverters in their cascade connections, and the $\phi_1$ and $\phi_2$ clock signals are viewed as a first pulse train and a second pulse train, respectively. The $\phi_1$ clock line supplying $\phi_1$ clock signal pulses at dense pulse rate from the master clock generator 16 provides a means for applying the pulses in the first train to the clock ports of the first clocked logic inverters. AND gate 252, responding only to those $\phi_2$ clock signal pulses supplied at dense pulse rate from the master clock generator 16 that are coincidental with the final carry signal from the binary counter 21, as delayed by the clocked bit latch 253, provides a means for applying responses only to each $(2^N)^{th}$ ones of the pulses in the second train to the clock ports of the second clocked logic inverters.

In a variant of the FIG. 8 decimation filter the delayed final carry bit used by AND gate 252 in generating sparse $\phi_2$ clock signal is generated by decoding an arithmetic one in binary counter 21 count output signal, rather than delaying the final carry with the clocked bit latch 253. Similarly, in a variant of the FIG. 7 decimation filter the delayed intermediate carry bit used by AND gate 252 in generating sparse $\phi_2$ clock signal is generated by decoding an arithmetic one in clocked data latch 212 output signal. These variants entail more digital hardware in the decoder than required for the clocked bit latch 253 or 243, however.

In another variant of decimation filter 17 the decimator of filter output signal uses a PISO register clocked with sparse $\phi_1$ clock signal generated as in FIG. 5 and sparse $\phi_2$ clock signal generated as in FIG. 7. In still another variant of decimation filter 17, the decimator of filter output signal uses a clocked latch clocked with sparse $\phi_1$ clock signal generated as in FIG. 6 and with sparse $\phi_2$ clock signal generated as in FIG. 8. These variants in which the decimators use both sparse $\phi_1$ and $\phi_2$ clock signals require more digital hardware than the decimation filters described in connection with FIGS. 5, 6, 7 and 8.

In variants of the decimation filters thusfar described, the binary counter 21 may be constructed using edge-triggered flip-flops in successive frequency-dividing stages. In such a counter there is a time that a pulse count may momentarily appear before the counter settles to the true count. Such false count conditions may be suppressed by decoding a count prior to the output count at which the final or intermediate carry is to occur, then supplying the decoder output to an edge-triggered data flip-flop which generates the carry used to reset the accumulator or to unblank the high sample rate clocking signal for generating the sparse low sample rate clocking signal.

Decimation filter 17 can be of a type providing both a parallel-bit filter response and a serial-bit filter response. This is useful where the oversampling analog-to-digital converter is of a type that accepts input signal of either polarity and the current transformer 11 output signals are converted without the full-wave rectification of a rectifier 14. The decimation filter 17 response is squared to provide rectification of the signal supplied to trip circuitry, with a clocked latch providing the parallel-bit response of filter 17 acting as the multiplicand register of a digital multiplier receiving from a PISO register the serial-bit response of filter 17 as multiplier signal. The serial-bit product from the digital multiplier is the squared response of filter 17 supplied to trip circuitry 18. The clocked latch and PISO register can correspond to elements 221 and 231 of FIGS. 5 and 6, respectively, receiving sparse $\phi_1$ clock signal from a single AND gate, for example. As a further example, the clocked latch and PISO register can correspond to elements 241 and 251 of FIGS. 7 and 8, respectively, receiving sparse $\phi_2$ clock signal from a single AND gate.

Weighting circuit 19 has been described as a straight-through wire connection weighting all samples by unity, but other weighting circuits known in the art may be used in digital filters embodying the invention. For example, the weights defining any kernel function can be stored in a read-only memory addressed by binary counter 21 and convolved with filter input signal samples using a digital multiplier. In another weighting circuit the most significant bit of binary counter 21 output signal being a ONE can be used to selectively complement the less significant bits of binary counter 21 output signal, and the result can have a trailing ONE appended to it. This generates a triangularly weighted kernel that can be convolved with filter input signal samples using a digital multiplier.

One skilled in the art and acquainted with the foregoing disclosure will be enabled to design other embodiments of the invention and this should be borne in mind when construing the scope of the claims which follow.

What is claimed is:

1. A clocked bit latch for latching at a submultiple of a given pulse rate, said clocked bit latch comprising:
   means for generating a first succession of pulses at a given pulse rate;
   means for generating a second succession of pulses at a submultiple of said given pulse rate, the pulses in said second succession interleaved amongst said first succession of pulses so as not to overlap them; and
   respective initial and final clocked logic inverters, one of said respective initial and final clocked logic inverters being clocked by said first succession of pulses and the other being clocked by said second succession of pulses, said respective initial and final clocked logic inverters each having a respective input connection and having a respective output connection with associated capacitance, the input connection of said respective initial clocked logic inverter providing an input connection for said clocked bit latch, the output connection of said respective initial clocked logic inverter connecting to the input connection of said respective final clocked logic inverter, and the output connection of said respective final clocked logic inverter providing an output connection for said clocked bit latch.

2. A clocked bit latch as set forth in claim 1 being identified by the ordinal number first and being included in a combination also including:
   at least one further clocked bit latch sharing with said first clocked bit latch said means for generating a first succession of pulses at a given pulse rate, sharing with said first clocked bit latch said means for generating a second succession of pulses at a submultiple of said given pulse rate, and having respective initial and final clocked logic inverters, one of said respective initial and final clocked logic inverters being clocked by said first succession of pulses and the other being clocked by said second succession of pulses, said respective initial and final clocked logic inverters each having a respective input connection and having a respective output connection with associated capacitance, the input connection of said respective initial clocked logic inverter providing an input connection for said further clocked bit latch, the output connection of said respective initial clocked logic inverter connecting to the input connection of said respective final clocked logic inverter, and the output connection of said respective final clocked logic inverter providing an output connection for said further clocked bit latch.

3. A combination as set forth in claim 2 further including:

means for supplying respective bits of plural-bit input signal to the input connections of said clocked bit latches.

4. A combination as set forth in claim 3 further including:

means for taking respective bits of a plural-bit output signal from the output connections of said clocked bit latches.

5. A combination comprising:

a plurality of clocked bit latches N in number identified by respective ones of consecutive ordinal numbers zeroeth through $(N-1)^{th}$, N being a positive integer at least two said zeroeth through $(N-1)^{th}$ clocked bit latches sharing with each other a single means for generating a first succession of pulses at a given pulse rate, said zeroeth through $(N-1)^{th}$ clocked bit latches sharing with each other single means for generating a second succession of pulses at a submultiple of said given pulse rate, and said zero through $(N-1)^{th}$ clocked bit latches each having respective initial and final clocked logic inverters, one of said respective initial and final clocked logic inverters being clocked by said first succession of pulses and the other being clocked by said second succession of pulses, said respective initial and final clocked logic inverters each having a respective input connection and having a respective output connection with associated capacitance, the input connection of said respective initial clocked logic inverter providing an input connection for said further clocked bit latch, the output connection of said respective initial clocked logic inverter connecting to the input connection of said respective final clocked logic inverter, and the output connection of said respective final clocked logic inverter providing an output connection for said further clocked bit latch; and a plurality of multiplexers, N in number, identified by respective ones of consecutive ordinal numbers zeroeth through $(N-1)^{th}$, each said multiplexer having an output connection to the input connection of said clocked bit latch identified by the same ordinal number, each said multiplexer having a first input connection and a second input connection selectively connected to its output connection responsive to a control signal, each of said multiplexers except the $(N-1)^{th}$ having its first input connection connecting from the output connection of the clocked bit latch identified by an ordinal number one larger than the ordinal number it is identified by;

means for supplying respective bits of a plural-bit input signal to the second input connections of said multiplexers; and means for taking serial bits of an output signal from the output connection of said zeroeth clocked bit latch at said submultiple of said given pulse rate.

6. In combination:

means for supplying plural-phase non-overlapping clock signals comprising first and second trains of pulses occurring at a given pulse rate, successive pulses of which first and second pulse trains alternate in occurrence, said first and second trains of pulses corresponding respectively to a first phase and to a second phase of said non-overlapping clock signals;

means receptive of said plural-phase non-overlapping clock signals for supplying N-parallel-bit subsampler input signal samples at said given pulse rate, N being a positive plural integer; and a subsampler for serially generating subsampler output signal samples each having N bits that correspond to the N bits in each $(2^N)^{th}$ successive one of said N-parallel-bit subsampler input signal samples, said subsampler comprising:

a respective multiplexer corresponding to each of the N different bits of a subsampler input signal sample, having a first input connection for receiving that bit, having a second input connection, having a control connection, and having an output connection, said multiplexers being identified by consecutive ordinal numbers beginning with zeroeth and ending with $(N-31\ 1)^{th}$;

respective first and second clocked logic inverters connected in a cascade connection from the output connection of each said multiplexer to provide a respective clocked bit latch, said cascade connection from the output connection of the zeroeth multiplexer being for supplying said subsampler output signal samples, and each other cascade connection from the output connection of one of said multiplexers being connected to the second input connection of the multiplexer identified by next lower ordinal number than it is, each of said first and second clocked logic inverters having a respective clock port and a respective output capacitance, said first and second clocked logic inverters in each cascade connection being connected in a same prescribed order, either first before second or first after second;

means for applying, to the clock ports of said first clocked logic inverters, responses to only each $(2^N/N)^{th}$ ones of the pulses in said first train;

means for applying the pulses in said second train to the clock ports of said second clocked logic inverters; and means for applying control signals to the control connections of said multiplexers that condition them to select to their respective output connections responses to the bits received at their respective input connections, said selection being made only each $N^{th}$ time the clocked bit latch connecting directly from said multiplexer output connection receives a $(2^N/N)^{th}$ one of the pulses in one of said first and second trains.

7. A combination as set forth in claim 6 wherein said means for supplying N-parallel-bit subsampler input signal samples is a time-domain digital filter.

8. A combination as set forth in claim 7 wherein said means for supplying N-parallel-bit subsampler input signal samples is a time-domain digital filter that includes:
  a binary counter for generating a modulo-$2^N$ count of said plural-phase clock signals, a final carry signal when a zero count is reached, and an intermediate carry signal whenever a zero count is reached in a modulo-$(2^N/N)$ portion of the modulo-$2^N$ count; and
  means for accumulating weighted samples of a digital filter input signal supplied at said given pulse rate over each period of time beginning with a final carry signal being generated and extending over $2^N$ succeeding samples.

9. A combination as set forth in claim 8 wherein said same prescribed order of cascade connection of said first and second clocked logic inverters is first before second; and wherein said means for applying responses to only each $(2^N/N)^{th}$ ones of the pulses in said first train to the clock ports of said first clocked logic inverters comprises:
  a two-input AND gate receiving said first train of pulses at one input connection thereof, receiving each said intermediate carry signal without substantial delay at the other input connection thereof, and applying from an output connection thereof said responses to only each $(2^N/N)^{th}$ ones of the pulses in said first train.

10. A combination as set forth in claim 8; wherein said same prescribed order of cascade connection of said first and second clocked logic inverters is first after second; and wherein said means for applying responses to only each $(2^N/N)^{th}$ ones of the pulses in said first train to the clock ports of said first clocked logic inverters comprises:
  means for delaying each said intermediate carry signal to generate a corresponding delayed intermediate carry signal;
  a two-input AND gate receiving said first train of pulses at one input connection thereof, receiving each said delayed intermediate carry signal at the other input connection thereof, and applying from an output connection thereof said responses to only each $(2^N/N)^{th}$ ones of the pulses in said first train.

11. A combination as set forth in claim 8 including:
  a delta-sigma modulator responsive to an analog signal for generating said samples of a digital filter input signal.

12. A combination as set forth in claim 11 including means for supplying said analog signal to said delta-sigma modulator wherein said analog signal is subharmonically related to said given pulse rate.

13. A combination as set forth in claim 6 wherein said means for supplying N-parallel-bit subsampler input signal samples is an oversampling analog-to-digital converter with a time-domain digital filter included therein.

14. In combination:
  means for supplying plural-phase non-overlapping clock signals comprising first and second trains of pulses occurring at a given pulse rate, successive pulses of which first and second pulse trains alternate in occurrence, said first and second trains of pulses corresponding respectively to a first phase and to a second phase of said non-overlapping clock signals;
  means receptive of said plural-phase non-overlapping clock signals for supplying N-parallel-bit subsampler input signal samples at said given pulse rate, N being a positive plural integer; and
  a subsampler for generating output signal samples that replicate each Nth one of said subsampler input signal samples, said subsampler having for each bit place of its said subsampler input signal samples:
  respective first and second clocked logic inverters connected in cascade connection to provide a respective clocked bit latch for generating a respective bit place of the output signal samples of said subsampler, said respective first and second clocked logic inverters each having a respective clock port and a respective output capacitance, said first and second clocked logic inverters in each cascade connection being connected in a same prescribed order, either first before second, or first after second;
  means for applying to the clock ports of said first clocked logic inverters responses to only each $(2^N)^{th}$ ones of the pulses in said first train; and
  means for applying the pulses in said second train to the clock ports of said second clocked logic inverters.

15. A combination as set forth in claim 14, wherein said means for supplying N-parallel-bit subsampler input signal samples is a time-domain digital filter.

16. A combination as set forth in claim 15 wherein said means for supplying N-parallel-bit subsampler input signal samples is a time-domain digital filter that includes:
  a binary counter for generating a modulo-$2^N$ count of said plural-phase clock signals and a final carry signal when a zero count is reached; and
  means for accumulating weighted samples of a digital filter input signal supplied at said given pulse rate over each period of time beginning with a final carry signal being generated and extending over N samples.

17. A combination as set forth in claim 16; wherein said same prescribed order of interconnection is first clocked logic inverter before second clocked logic inverter, and wherein said means for applying responses to only each $(2^N)^{th}$ ones of the pules in said first train to the clock ports of said first clocked logic inverters comprises:
  a two-input AND gate receiving said first train of pulses at one input connection thereof, receiving each said final carry signal without substantial delay at the other input connection thereof, and applying from an output connection thereof said responses to only each $(2^N)^{th}$ ones of the pulses in said first train.

18. A combination as set forth in claim 16; wherein said same prescribed order of cascade connection is first clocked logic inverter after second clocked logic inverter; and wherein said means for applying responses to only each $(2^N)^{th}$ ones of the pulses in said first train to the clock ports of said first clocked logic inverters comprises:

means for delaying each said final carry signal to generate a corresponding delayed final carry signal;

a two-input AND gate receiving said first train of pulses at one input connection thereof, receiving each said delayed final carry signal at the other input connection thereof, and applying from an output connection thereof said responses to only each $(2^N)^{th}$ ones of the pulses in said first train.

19. A combination as set forth in claim 16, including:
a delta-sigma modulator responsive to an analog signal for generating said samples of a digital filter input signal at a rate that is subharmonically related to said given pulse rate.

20. A combination as set forth in claim 14 wherein said means for supplying N-parallel-bit subsampler input signal samples is an oversampling analog-to-digital converter with a time-domain digital filter included therein.

21. In combination:
first, second, third and fourth clocked logic inverters each having a respective input connection, a respective output connection with associated capacitance and respective ports for receiving a respective clocking signal thereto, the output connection of said first clocked logic inverter connecting to the input connection of said second clocked logic inverter, the output connection of said second clocked logic inverter connecting to the input connection of said third clocked logic inverter, the output connection of said third clocked logic inverter connecting to the input connection of said fourth clocked logic inverter;

means for generating a clock signal having first and second phases of non-overlapping pulses respectively serving as clocking signals for said first clocked logic inverter and for said second clocked logic inverter;

first pulse-applying means, receptive of the pulses in said first phase of said clock signal, for applying at least some of them as clocking signals to said third clocked logic inverter;

second pulse-applying means, receptive of the pulses in said second phase of said clock signal, for applying at least some of them as clocking signals to said fourth clocked logic inverter; and blanking means included in one of said first and second pulse-applying means so that one of said first and second pulse-applying means applies, as said clocking signal therefrom, only every Nth pulse it is receptive of, N being a positive plural integer.

* * * * *